(12) United States Patent
Hernier et al.

(10) Patent No.: US 8,914,223 B2
(45) Date of Patent: Dec. 16, 2014

(54) METHOD AND SYSTEM FOR CONTROLLING A VEHICLE HAVING A HYBRID DRIVE

(75) Inventors: Markus Hernier, Gerlingen (DE); Andreas Greis, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 563 days.

(21) Appl. No.: 12/735,955

(22) PCT Filed: Nov. 25, 2008

(86) PCT No.: PCT/EP2008/066151
§ 371 (c)(1),
(2), (4) Date: Nov. 16, 2010

(87) PCT Pub. No.: WO2009/112104
PCT Pub. Date: Sep. 17, 2009

(65) Prior Publication Data
US 2011/0054723 A1 Mar. 3, 2011

(30) Foreign Application Priority Data

Mar. 10, 2008 (DE) .......................... 10 2008 000 579

(51) Int. Cl.
*G06F 19/00* (2011.01)
(52) U.S. Cl.
USPC ........... 701/112; 180/65.28; 903/902; 701/22
(58) Field of Classification Search
USPC ........ 701/103, 112, 102, 104, 105, 22; 475/5; 180/65.4, 65.28; 903/902
See application file for complete search history.

(56) References Cited

U.S. PATENT DOCUMENTS

| | | | |
|---|---|---|---|
| 2003/0144773 A1* | 7/2003 | Sumitomo | 701/22 |
| 2004/0079564 A1* | 4/2004 | Tabata | 180/65.2 |
| 2004/0149255 A1 | 8/2004 | zur Loye et al. | |
| 2006/0042587 A1 | 3/2006 | Ellinger et al. | |
| 2006/0106524 A1* | 5/2006 | Schmitz et al. | 701/112 |
| 2006/0113129 A1* | 6/2006 | Tabata | 180/65.2 |
| 2006/0152180 A1* | 7/2006 | Tahara et al. | 318/139 |
| 2006/0237247 A1* | 10/2006 | Severinsky et al. | 180/65.4 |
| 2006/0289208 A1* | 12/2006 | Katsuhiro et al. | 180/65.2 |
| 2007/0113803 A1* | 5/2007 | Froloff et al. | 123/90.11 |
| 2008/0156553 A1* | 7/2008 | Hoogenraad | 180/65.2 |
| 2008/0219866 A1* | 9/2008 | Kwong et al. | 417/410.1 |
| 2009/0030595 A1* | 1/2009 | Sugai | 701/112 |
| 2009/0209381 A1* | 8/2009 | Ai et al. | 475/5 |
| 2009/0211825 A1 | 8/2009 | Mann et al. | |
| 2010/0036589 A1* | 2/2010 | Ando | 701/105 |

FOREIGN PATENT DOCUMENTS

| | | |
|---|---|---|
| CN | 1757555 | 4/2006 |
| DE | 10 2005 051 002 | 4/2007 |
| EP | 1 083 319 | 3/2001 |

* cited by examiner

*Primary Examiner* — Ronnie Mancho
(74) *Attorney, Agent, or Firm* — Kenyon & Kenyon LLP

(57) ABSTRACT

The invention relates to a method and an arrangement for controlling a vehicle with a hybrid drive, wherein during the driving mode an internal combustion engine (1) and a second drive unit (12) contribute individually or in tandem to the drive torque of the vehicle. In a method for controlling a vehicle with a hybrid drive, according to which the toxic emissions are kept to the minimum level possible, the control and regulation behaviour of the internal combustion engine (1) is set in accordance with the operating mode of the second drive unit (12).

12 Claims, 2 Drawing Sheets

METHOD AND SYSTEM FOR CONTROLLING A VEHICLE HAVING A HYBRID DRIVE

BACKGROUND OF THE INVENTION

1. Field of the Invention

The present invention relates to a method for controlling a vehicle having a hybrid drive, in which during driving operation an internal combustion engine and a second drive unit contribute individually or jointly to the drive torque of the vehicle.

2. Description of Related Art

Vehicles having a hybrid drive structure, as described in published German patent application document DE 10 2005 051 002 A1, have an internal combustion engine and a second drive unit, which may be an electric motor or a hydraulic drive motor, for example. Novel constraints with regard to the load requirements on the internal combustion engine result in such hybrid drives.

Thus, the drive torque may be applied by both drive units during driving operation. Provided that the quantity of stored energy and the power of the second drive unit are sufficient, the vehicle is driven without the internal combustion engine. In other driving situations, this power which is applied by the second drive unit is generated by the internal combustion engine by delivering a higher load to the drive train. Thus, during hybrid operation the internal combustion engine operates at a higher load level than in a conventional vehicle. When the internal combustion engine is controlled in the same way as for a conventional vehicle, high pollutant emissions result in the event of sudden high load changes, since the quantity of air supplied is not sufficient to oxidize the fuel.

BRIEF SUMMARY OF THE INVENTION

An object of the present invention, therefore, is to provide a method for controlling a vehicle having a hybrid drive, in which pollutant emissions are kept at the lowest possible level in all operating states of the hybrid drive.

The advantage of the present invention is that the precise interplay between the two drive units in the vehicle is taken into account, resulting in novel control and regulation options for the internal combustion engine. This applies in particular to an internal combustion engine having a lean combustion design. The control and regulation behavior of the internal combustion engine is therefore adjusted as a function of the operating mode of the second drive unit.

The selection of the control and regulation state influences the load delivery by the internal combustion engine, resulting in a modified torque distribution between the internal combustion engine and the second drive unit. This shift in torque distribution contributes to optimal setting of the operating point of the internal combustion engine, and thus helps minimize pollutant emissions from the internal combustion engine.

The control and regulation behavior of the internal combustion engine is advantageously selected from at least two control and regulation states, between which switching is performed as a function of the operating mode of the second drive unit. The selection among the various control and regulation states allows the control and regulation behavior of the internal combustion engine to be easily adapted to the hybrid operating mode at that moment.

In a first control and regulation state, the injection quantity is controlled and the air path is regulated. This may be referred to as load control, since the quantity of injected fuel is determined by the requested load. The quantity of oxygen necessary for oxidizing the fuel, as well as the exhaust gas provided by exhaust gas recirculation, determine the regulation of the air path.

In a second control and regulation state, the air path is controlled and the injection quantity is regulated. The second control and regulation state should always be set when this is possible for the second drive unit as a function of the possible power delivery by the electric motor and the charge state of the battery. Control and regulation of the air path is always slow. That is, for transient processes there is always a delay in setting the variables which determine the air path. For this reason, in the second control and regulation state the injection quantity, and therefore the load, is limited by the air supply. This results in better control of the emissions. However, this limits the load in certain driving situations (transient or dynamic), since the oxygen supply is insufficient. However, this depends greatly on the particular calibration.

In one refinement, operating parameters of the second drive unit are transmitted by a higher-level coordination unit to the control and regulation structure of the internal combustion engine in order to switch between the two control and regulation states. The operating parameters of the second drive unit represent the information used to decide whether the first or the second control and regulation state is set in the internal combustion engine.

If the second drive unit is designed as an electric motor, its operating parameters include the torque limits as a function of the rotational speed and the temperature. Information concerning the energy content of the energy storage medium is relayed via the coordination unit, which is connected to a battery management system.

The coordination unit distributes the drive torque to the internal combustion engine and the second drive unit. The pollutant emissions are thus minimized, using functions which take only the hybrid-specific operation into account. For this purpose the coordination unit detects the torque request. The coordination unit distributes the drive torque to the internal combustion engine and to the second drive unit as a function of the actual torque of the internal combustion engine and the operating state of the second drive unit.

In addition to the torque coordination, the coordination unit may contain other functions, such as vehicle control, resulting in better utilization of the computing unit on which the coordination unit is based.

For the case in which, in the second control and regulation state of the internal combustion engine, part of the fuel is injected into a combustion chamber of the internal combustion engine and homogenized before ignition, and part is injected into the combustion chamber only after ignition, this ((p)HCCI) combustion process (partly homogeneous charge compression ignition) results in a further reduction in pollutant emissions.

In another refinement of the present invention, in a system for controlling a vehicle having a hybrid drive, an internal combustion engine is connected to an engine control unit, and a second drive unit is connected to a drive control unit, via which the torque of the internal combustion engine and the torque of the second drive unit, respectively, are adjusted. In a system in which the pollutant emissions from the internal combustion engine are kept at the lowest possible level in all operating states of the hybrid drive, the engine control unit has a control and regulation structure which adjusts the behavior of the internal combustion engine as a function of the operating state of the second drive unit. The emission of pollutants from the vehicle is limited by taking the hybrid operating state of the vehicle into account.

In order to design the adaptation of the hybrid drive to the load situation in the most optimal manner possible, the engine control unit switches the control and regulation structure between at least two control and regulation states.

To achieve a torque request which optimally corresponds to the operating states of the internal combustion engine and of the second drive unit, the engine control unit and the drive control unit are connected to a coordination unit which distributes the torque request to the engine control unit and to the drive control unit. This coordination unit evaluates the operating data provided by the engine control unit and the drive control unit, and based on this evaluation determines the distribution of the torque request to the two drive units.

In one embodiment the coordination unit is directly connected to the drive control unit of the second drive unit designed as an electric motor, and/or to a battery management system, as a result of which all operating parameters of the electric motor and of the energy storage medium are reported to the coordination unit.

In the coordination unit designed as a vehicle control unit, the driving behavior of the vehicle, such as the speed, application of the brake, etc., may also be taken into account in determining the torque distribution.

DETAILED DESCRIPTION OF THE INVENTION

Figure 1:
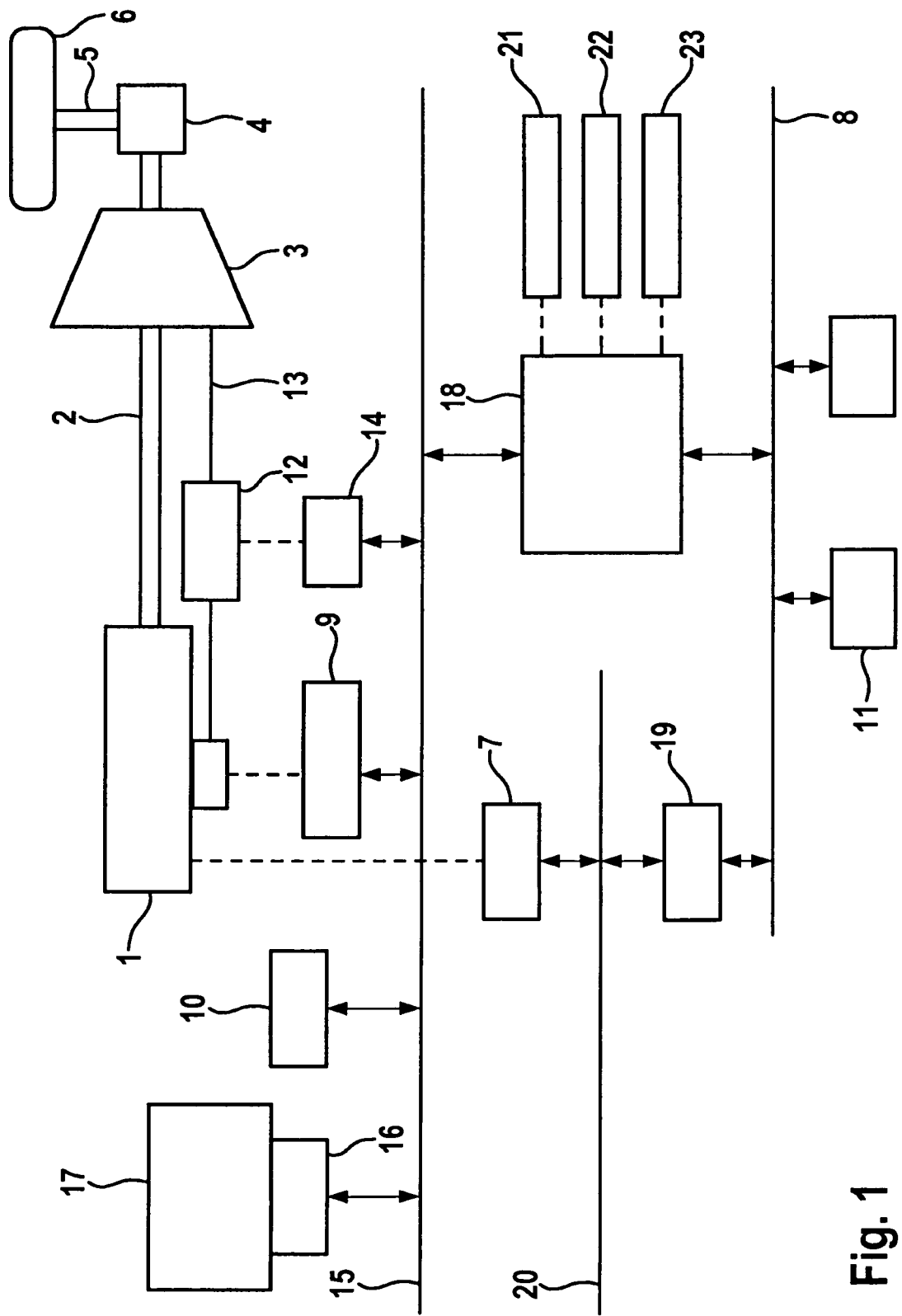
FIG. 1 shows one exemplary embodiment for an expanded control unit structure for vehicles having a hybrid drive.

FIG. 1 shows an expanded control unit structure for a vehicle having a hybrid drive. The hybrid drive is formed by an internal combustion engine 1 and an electric motor 12 as the second drive unit. Any given internal combustion engine may be used, provided that it is a lean-operating type of engine.

Internal combustion engine 1 is connected via drive train 2 to transmission 3, which via clutch 4 leads to wheel axle 5 for driving wheel 6.

Electric motor 12 is connected via its own drive train 13 to transmission 3, and thus contributes to the drive of wheels 6 and to the total torque of the vehicle. Electric motor 12 also has its own electric motor control unit 14, which is connected to a hybrid CAN bus 15 via which all of the control units which have an influence on the hybrid-specific driving operation of the vehicle are able to communicate with one another. These include battery management system 16 of traction battery 17, low-voltage battery 10, alternating current (AC) compressor 9, and other control units, not shown in greater detail, which control the transmission, among other things.

A vehicle control unit 18 communicates via hybrid CAN bus 15 with the control units connected thereto, in particular with electric motor control unit 14. The vehicle control unit is also connected to the control unit for brake 11 via CAN bus 8.

CAN bus 8 is connected, via a gateway 19, to a gateway CAN bus 20, via which the individual bus systems of the vehicle communicate with one another.

Engine control unit 7 is connected to vehicle control unit 18 via gateway CAN bus 20 and CAN bus 8.

Vehicle control unit 18 is connected to various sensors of the vehicle, such as an operating parameter sensor 21, temperature sensor 22 which indicates the cooling water temperature, and voltmeter 23, which is connected to the DC/DC converter. Vehicle control unit 18 receives information from these sensors 21, 22, 23 concerning the instantaneous operating parameters for the vehicle operation.

The torque of the output side for the hybrid vehicle is controlled in vehicle control unit 18. For this purpose, vehicle control unit 18 evaluates the setpoint data which are set by the driver of the hybrid vehicle via the gas pedal and delivered by operating parameter sensor 21. The torque which is relevant for the output side is applied by internal combustion engine 1 and by electric motor 12. Vehicle control unit 18 functions as a coordination unit, and coordinates the contributions to the torque provided by internal combustion engine 1 and electric motor 12. Thus, vehicle control unit 18 is of a higher-order level than engine control unit 7 and electric motor control unit 14.

Figure 2:
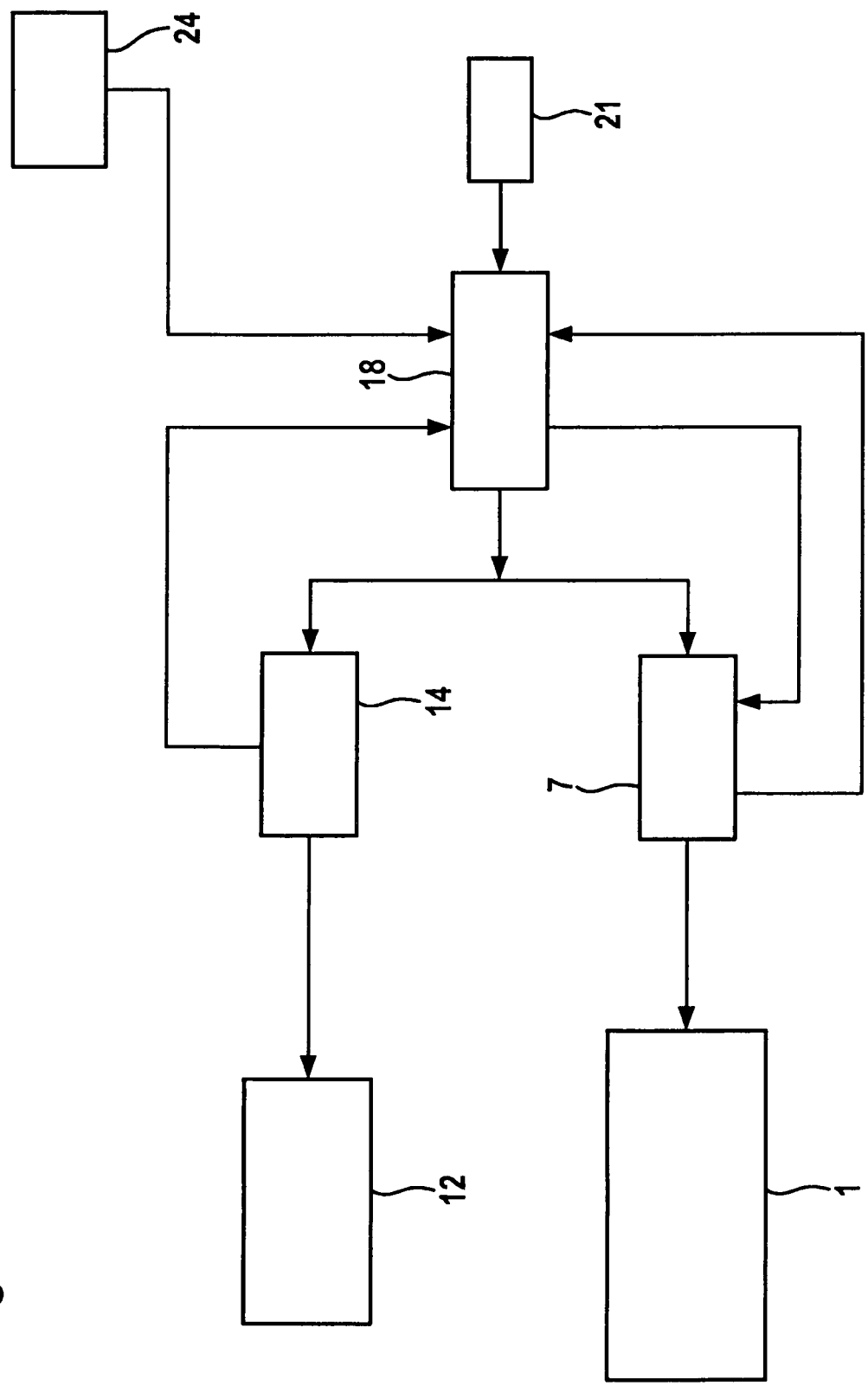
FIG. 2 shows a control and regulation structure for a hybrid vehicle.

In the control and regulation structure of the hybrid vehicle as illustrated in FIG. 2, vehicle control unit 18 receives not only the torque request from operating parameter sensor 21, but also operating data from electric motor control unit 14, engine control unit 7, and battery management system 24. Electric motor control unit 14 supplies information concerning the torque limits of electric motor 12. These torque limits are output as a function of the rotational speed and the temperature of electric motor 12. In addition, electric motor control unit 14 estimates the time range over which the given torques are effective, and relays this information to vehicle control unit 18.

Battery management system 24 notifies vehicle control unit 18 of the charge state of the energy storage medium.

Engine control unit 7 measures the actual torque and the temperature of internal combustion engine 1 and relays this information to vehicle control unit 18. Vehicle control unit 18 determines the torque request for electric motor 12 and internal combustion engine 1 as a function of these operating parameters and an operating strategy according to which the internal combustion engine is to be operated in ranges which are optimal for fuel consumption and emissions.

If engine control unit 7 reports an actual torque to vehicle control unit 18 which is much lower than the intended torque, the torque differential is applied by electric motor 12.

Engine control unit 7 converts the torque request of vehicle control unit 18 to appropriate values for the injection and air supply for internal combustion engine 1.

In addition to the desired power, vehicle control unit 18 also transmits to engine control unit 7 information concerning the possible maximum and minimum load of electric motor 12 in the form of the torque limits and their possible duration, which are a function of the quantity of stored energy. Based on the above-mentioned values and the change in load, engine control unit 7 specifies which control and regulation structure is to be used. With regard to the change in load, a distinction is made between two cases:

The first case is an increase in load of internal combustion engine 1. If the change in load is small compared to the preceding event, and/or electric motor 12 still has sufficient energy and power reserves, the air path is controlled. That is, a variable turbine geometry (VTG) actuator of the exhaust gas turbocharger which is responsible for supplying fresh air to the combustion chamber of internal combustion engine 1 is controlled in exactly the same manner as an exhaust gas recirculation (EGR) valve, which recirculates exhaust gas-laden air back to the combustion chamber.

The injection quantity and therefore also the load is regulated as a function of this charge composition, composed of air and exhaust gas, in the combustion chamber.

The regulation depends on a determination of the oxygen and exhaust gas content. Since the resulting torque of internal combustion engine 1 is too low compared to the intended torque, vehicle control unit 18 requests increased torque from electric motor 12.

On the other hand, if the desired change in load for the internal combustion engine is very large, and/or the electric motor has only low power reserves, or the energy storage medium has only low energy reserves, the injection quantity is controlled and the air path is regulated.

The second case is a decrease in load of internal combustion engine 1. For such a decrease in load, the quantity of air would decrease too slowly in a conventional vehicle (no hybrid drive).

If the decrease in load is low compared to the preceding period of time, and/or the electric motor still has a generator reserve and the energy storage medium is still able to receive energy, in this case the air path is controlled. The injection quantity is regulated according to the charge which results at that moment in the combustion chamber. The resulting excessive power of the internal combustion engine is absorbed by the energy storage medium via electric motor 12 acting as a generator.

If it is not possible for the additional load to be absorbed by electric motor 12 and/or the energy storage medium, the injection quantity is controlled and the air path is regulated.

Thus, the air path is regulated only when the electric drive train is not able to apply or recover the load necessary for compensation.

As a result of this tuning, the internal combustion engine operates in a quasi-steady-state mode. This is carried out primarily to reduce the pollutant emissions.

The dynamic power is absorbed by the electric motor within the limits specified by the overall system.

The described method is a component of an operating strategy in which the internal combustion engine is operated only in ranges which are optimal for fuel consumption and emissions.

What is claimed is:

1. A method for controlling a vehicle having a hybrid drive including an internal combustion engine connected to an engine control unit and a second drive unit connected to a drive control unit, the method comprising:
   selectively controlling, by the engine control unit and the drive control unit, respective points in time when the internal combustion engine and the second drive unit contribute to overall driving of the hybrid drive, each of the internal combustion engine and the second drive unit being configured to be selectively driven: (a) alone, whereby only one of the internal combustion engine or the second drive unit contributes to the overall driving of the hybrid drive; or (b) jointly, whereby both the internal combustion engine and the second drive unit contribute to the overall driving of the hybrid drive; and
   adjusting, by the engine control unit, a control and regulation mode of the internal combustion engine as a function of the operating mode of the second drive unit;
   wherein the selection is made from at least two control and regulation modes for adjusting the control and regulation behavior of the internal combustion engine;
   wherein the first control and regulation mode of the internal combustion engine includes a control of an injection quantity and a regulation of an air path; and
   wherein the second control and regulation mode of the internal combustion engine includes a control of an air path and a regulation of an injection quantity.

2. The method as recited in claim 1, wherein operating parameters of the second drive unit are transmitted by a coordination unit to a control and regulation unit of the internal combustion engine in order to switch between the two control and regulation modes.

3. The method as recited in claim 2, wherein the operating parameters are transmitted to the coordination unit by at least one of a control unit of the second drive unit and a battery management system.

4. The method as recited in claim 2, wherein the coordination unit controls distribution of drive torque to the internal combustion engine and to the second drive unit.

5. The method as recited in claim 4, wherein the coordination unit detects a torque request and distributes drive torque to the internal combustion engine and to the second drive unit as a function of actual torque of the internal combustion engine and the operating state of the second drive unit.

6. The method as recited in claim 2, wherein the coordination unit includes at least one vehicle control unit.

7. The method as recited in claim 1, wherein in the second control and regulation mode of the internal combustion engine, a first portion of the injection quantity is injected into a combustion chamber of the internal combustion engine and homogenized before ignition, and a second portion of the injection quantity is injected into the combustion chamber only after ignition.

8. A system for controlling a vehicle having a hybrid drive including an internal combustion engine and a second drive unit, the system comprising:
   an engine control unit connected to the internal combustion engine; and
   a drive control unit connected to the second drive unit;
   wherein the drive control unit is configured to adjust the torque of the internal combustion engine and the torque of the second drive unit, and wherein the engine control unit is configured to adjust a control and regulation behavior of the internal combustion engine as a function of the operating state of the second drive unit;
   wherein the internal combustion engine and the second drive unit are adapted to selectively control respective points in time to contribute to overall driving of the hybrid drive, each of the internal combustion engine and the second drive unit being configured to be selectively driven: (a) alone, whereby only one of the internal combustion engine or the second drive unit contributes to the overall driving of the hybrid drive; or (b) joining, whereby both the internal combustion engine and the second drive unit contribute to the overall driving of the hybrid drive;
   wherein the selection is made from at least two control and regulation modes for adjusting the control and regulation behavior of the internal combustion engine;
   wherein the first control and regulation mode of the internal combustion engine includes a control of an injection quantity and a regulation of an air path; and
   wherein the second control and regulation mode of the internal combustion engine includes a control of an air path and a regulation of an injection quantity.

9. The system as recited in claim 8, wherein the engine control unit is configured to selectively switch between at least two control and regulation modes of the internal combustion engine.

10. The system as recited in claim 8, further comprising:
    a coordination unit connected to the engine control unit and the drive control unit, wherein the coordination unit is configured to distribute torque to the engine control unit and to the drive control unit.

11. The system as recited in claim 10, wherein the second drive unit is configured as an electric motor, and wherein the coordination unit is directly connected to the drive control unit and to a battery management system.

12. The system as recited in claim 10, wherein the coordination unit is a vehicle control unit.

* * * * *